(12) United States Patent
Kim

(10) Patent No.: US 12,352,342 B2
(45) Date of Patent: Jul. 8, 2025

(54) CONTINUOUSLY VARIABLE TRANSMISSION

(71) Applicant: DOB CO., LTD., Gyeongsangnam-do (KR)

(72) Inventor: Hyeon Soo Kim, Gyeongsangnam-do (KR)

(73) Assignee: DOB CO., LTD., Gyeongsangnam-do (KR)

( * ) Notice: Subject to any disclaimer, the term of this patent is extended or adjusted under 35 U.S.C. 154(b) by 0 days.

(21) Appl. No.: 18/710,622

(22) PCT Filed: Sep. 16, 2022

(86) PCT No.: PCT/KR2022/013911
§ 371 (c)(1),
(2) Date: May 16, 2024

(87) PCT Pub. No.: WO2023/090610
PCT Pub. Date: May 25, 2023

(65) Prior Publication Data
US 2025/0027556 A1 Jan. 23, 2025

(30) Foreign Application Priority Data
Nov. 19, 2021 (KR) .......................... 10-2021-0160698

(51) Int. Cl.
*F16H 37/12* (2006.01)
(52) U.S. Cl.
CPC .................................... *F16H 37/12* (2013.01)
(58) Field of Classification Search
CPC ........ F16H 37/12; F16H 37/022; F16H 37/02; F16H 21/28; F16H 3/44
See application file for complete search history.

(56) References Cited

U.S. PATENT DOCUMENTS

| 2008/0207379 | A1* | 8/2008 | Kim | ...................... F16H 37/084 475/211 |
| 2016/0052595 | A1* | 2/2016 | Dommsch | ............ B62M 11/145 180/220 |

FOREIGN PATENT DOCUMENTS

| KR | 100436744 | 6/2004 |
| KR | 100582090 | 5/2006 |

(Continued)

OTHER PUBLICATIONS

Machine translation of KR 100436744 B1 (Year: 2004).*

*Primary Examiner* — Farhana Pervin
(74) *Attorney, Agent, or Firm* — JCIPRNET

(57) ABSTRACT

The present invention relates to a continuously variable transmission, and more specifically, to a continuously variable transmission that prevents power cut-off when shifting and minimizes a load/impact due to the shifting, and that includes an eccentric disk and an output shaft which rotate in the same direction to prevent noise/vibration/impact that is generated particularly when the eccentric disk that operates a link actuator and the output shaft rotate in opposite directions. According to an embodiment of the present invention, there is provided a continuously variable transmission including: an input shaft 2 that receives power as an input from outside; a planet gear 4 to which a part of the power is transmitted from the input shaft 2; a driven shaft 3 to which a part of the power is transmitted from the input shaft 2; a first link shaft 51 which is rotated with power transmitted from the driven shaft 3; a link actuator that is actuated by rotation of the first link shaft 51; a shift lever 6 that adjusts a shift ratio of the link actuator; and an output shaft 7 to which power is transmitted from the link actuator and the planet gear 4. The link actuator includes an eccentric disk 501 that eccentrically rotates around the first link shaft 51, a cam 502 that reciprocates by rotation of the eccentric (Continued)

disk 501, a first link 504 that is connected to the cam 502 and transmits power to the output shaft 7, and a one-way clutch 506 that is provided between the first link 504 and the output shaft 7 and transmits power only in one direction in which the output shaft is rotated. The first link shaft 51 and the output shaft 7 are driven in the same rotation direction by causing the first link shaft 51 to be rotated by the driven shaft 3.

3 Claims, 6 Drawing Sheets

(56) References Cited

FOREIGN PATENT DOCUMENTS

| KR | 101241819 | 3/2013 |
| KR | 1020160069564 | 6/2016 |
| KR | 101828249 | 2/2018 |

\* cited by examiner (a)

(b)

CONTINUOUSLY VARIABLE TRANSMISSION

TECHNICAL FIELD

The present invention relates to a continuously variable transmission, and more specifically, to a continuously variable transmission that prevents power cut-off when shifting and minimizes a load/impact due to the shifting, and that includes an eccentric disk and an output shaft which rotate in the same direction to prevent noise/vibration/impact that is generated particularly when the eccentric disk that operates a link actuator and the output shaft rotate in opposite directions.

BACKGROUND ART

Continuously variable transmissions can be used in numerous devices that utilize rotational power, such as bicycles, cars, motorcycles, and other vehicles.

Recently, there is a growth in demand for continuously variable transmissions to maximize efficiency of engines and motors.

The applicant of the present invention proposed Korean Patent Registration No. 10-1241819 to configure a continuously variable transmission, which discloses a continuously variable transmission capable of both forward rotation and reverse rotation.

In a case of configuring a continuously variable transmission according to Korean Patent Registration No. 10-1241819, an input gear 310 and an output shaft 400 are configured to have opposite rotation directions, as illustrated in FIG. 2 of the cited patent. In this case, the forward and reverse rotations may be performed, but there is a limit on application thereof to actual products because large noise, vibration, and impact are generated, and it is difficult to identify a cause of the noise, vibration, and impact.

SUMMARY OF INVENTION

Technical Problem

Long-term research and development enabled the applicant of the present invention to find that a cause of noise, vibration, and impact generated in the continuously variable transmission according to Korean Patent Registration No. 10-1241819 is due to the rotations in opposite directions, and a continuously variable transmission is provided that significantly reduces noise, vibration, and impact by having a configuration in which an input gear (a second driven gear, an eccentric disk 501 or a first link shaft 51 in the present invention) and an output shaft 7 have the same rotation direction.

An object to be achieved by the present invention is to provide a continuously variable transmission having a structure that significantly reduces noise, vibration, and impact in order to improve limits of the continuously variable transmission in the related art as described above.

Solution to Problem

According to the present invention, in order to improve limits of the continuously variable transmission in the related art as described above, there is provided a continuously variable transmission including: an input shaft that receives power as an input from outside; a planet gear to which a part of the power is transmitted from the input shaft; a driven shaft to which a part of the power is transmitted from the input shaft; a first link shaft which is rotated with power transmitted from the driven shaft; a link actuator that is actuated by rotation of the first link shaft; a shift lever that adjusts a shift ratio of the link actuator; and an output shaft to which power is transmitted from the link actuator and the planet gear. The link actuator includes an eccentric disk that eccentrically rotates around the first link shaft, a cam that reciprocates by rotation of the eccentric disk, a first link that is connected to the cam and transmits power to the output shaft, and a one-way clutch that is provided between the first link and the output shaft and transmits power only in one direction in which the output shaft is rotated. The first link shaft and the output shaft are driven in the same rotation direction by causing the first link shaft to be rotated by the driven shaft.

In addition, the link actuator may include a plurality of link sets including the eccentric disk, the cam, the first link, and the one-way clutch, and the link sets may include a hinge that is connected to one side of the cam, and second links of which each one end is connected to the hinge to extend from the hinge. The first link may have one end which is connected to the hinge and the other end which is connected to the one-way clutch. The continuously variable transmission may include a second link shaft connected to the other end of each of a plurality of the second links, and a position of the second link shaft may be adjusted by the shift lever.

Further, the shift lever may include a second link shaft adjusting part that is connected to both ends of the second link shaft, a second link shaft adjusting shaft that is fixed to a position separated from the second link shaft by a predetermined distance, and a manipulation part that extends from one side of the second link shaft adjusting shaft in a direction perpendicular to the second link shaft adjusting shaft and rotates around the second link shaft adjusting shaft within a predetermined angle range.

Furthermore, the planet gear may include a ring gear that is an external gear with respect to a first driving gear formed on the input shaft and has gear teeth on an outer circumferential surface and an inner circumferential surface of the ring gear, a plurality of satellite gears that are internal gears with respect to the ring gear, a sun gear that is positioned at a center of the ring gear and is an external gear with respect to the satellite gear, and a carrier that is connected to the plurality of satellite gear and has a central shaft concentric to the input shaft and a predetermined hollow to allow the input shaft to penetrate the carrier. The one-way clutch may transmit power to the carrier, and the one-way clutch may be configured not to be directly connected to the output shaft.

Moreover, the input shaft may include a first driving gear that transmits power to the planet gear, and the driven shaft may include a first driven gear that is connected to the first driving gear and has a gear ratio such that the driven shaft is accelerated faster than the input shaft, a bearing that is separated from the input shaft by a predetermined distance to have a central axis parallel to the input shaft and supports the driven shaft, and a second driving gear that is formed to have a diameter larger than a diameter of the first driven gear.

The first link shaft may include a second driven gear that is connected to the second driving gear and has a gear ratio such that the first link shaft is accelerated faster than the driven shaft.

Advantageous Effects of Invention

According to an embodiment of the present invention, it is possible to significantly reduce noise, vibration, and impact by having a configuration in which the rotation direction of a second driven gear, an eccentric disk 501 or a first link shaft 51 and the rotation direction of an output shaft 7 are identical.

In addition, in order to resolve unstable shifting when an input number of revolutions is low due to characteristics of the link actuator, a predetermined multi-stage gearshift is provided such that it is possible to increase the number of revolutions transmitted to the link actuator and improve shifting stability.

In addition, it is possible to prevent interference between members from occurring by positioning, on an outer side of the link actuator, a pivot point (second link shaft adjusting shafts 62) that adjusts a shift ratio of the link actuator.

DESCRIPTION OF EMBODIMENTS

Figure 1:
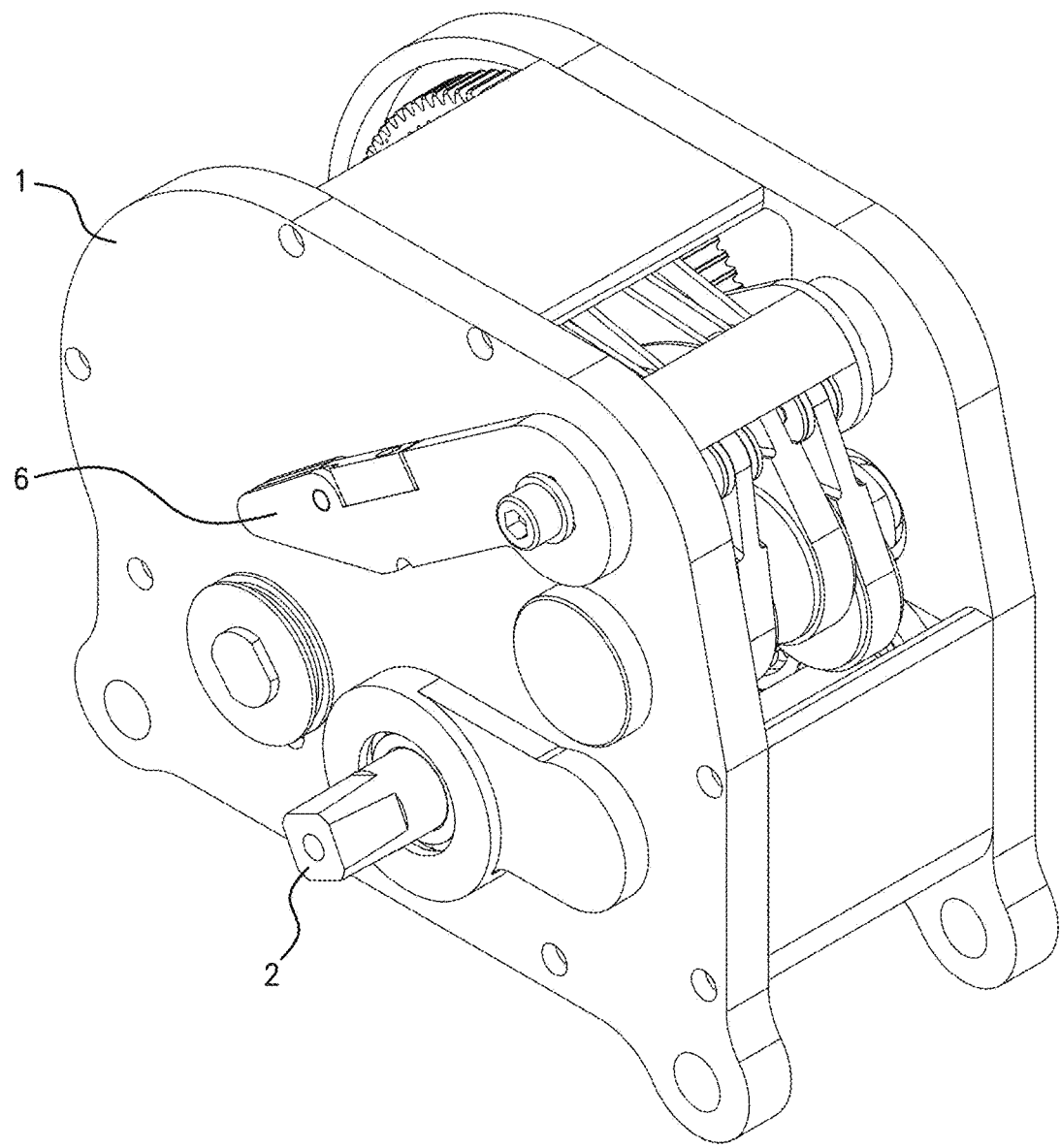
FIG. 1 is a perspective view of a continuously variable transmission according to an embodiment of the present invention.
Figure 2:
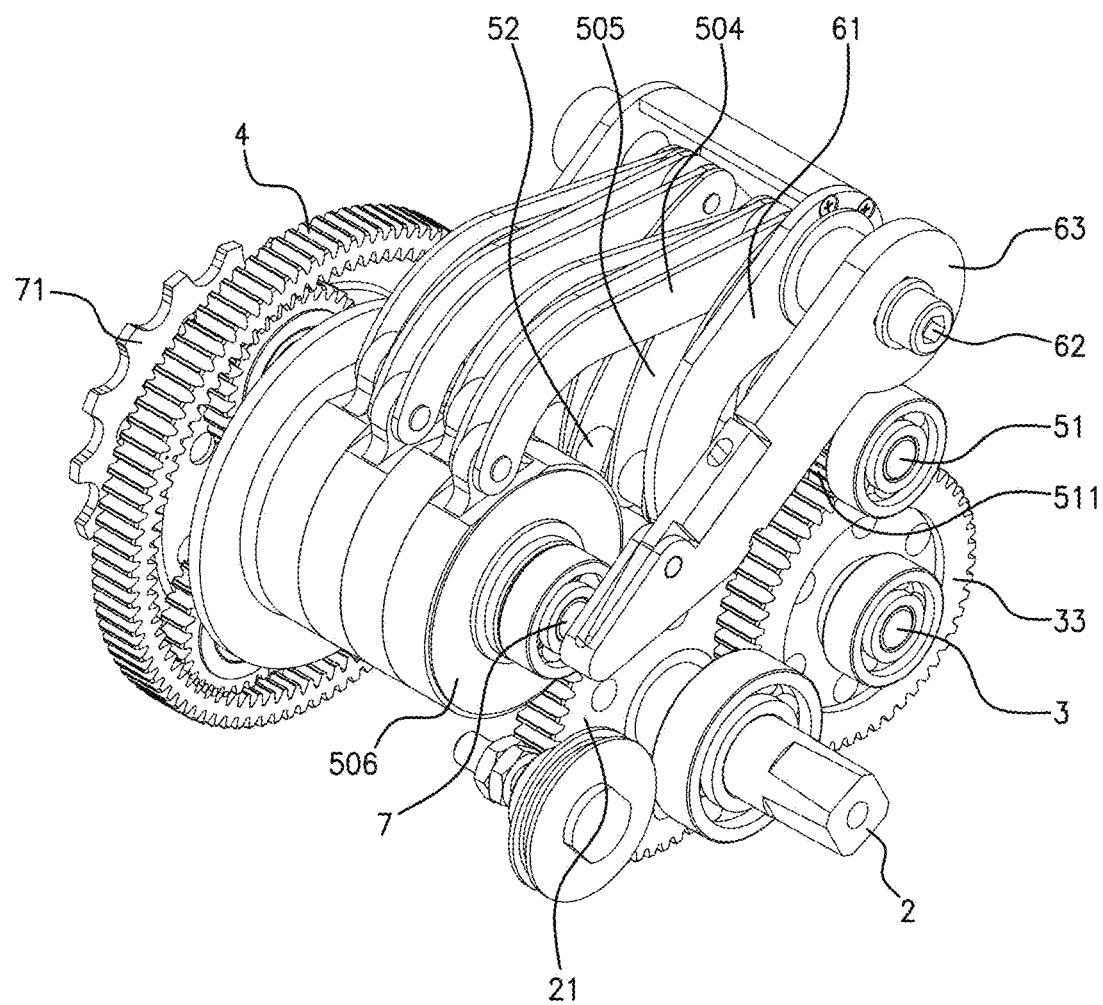
FIGS. 2 to 4 are perspective views of the continuously variable transmission from which a frame is removed according to the embodiment of the present invention.
Figure 3:
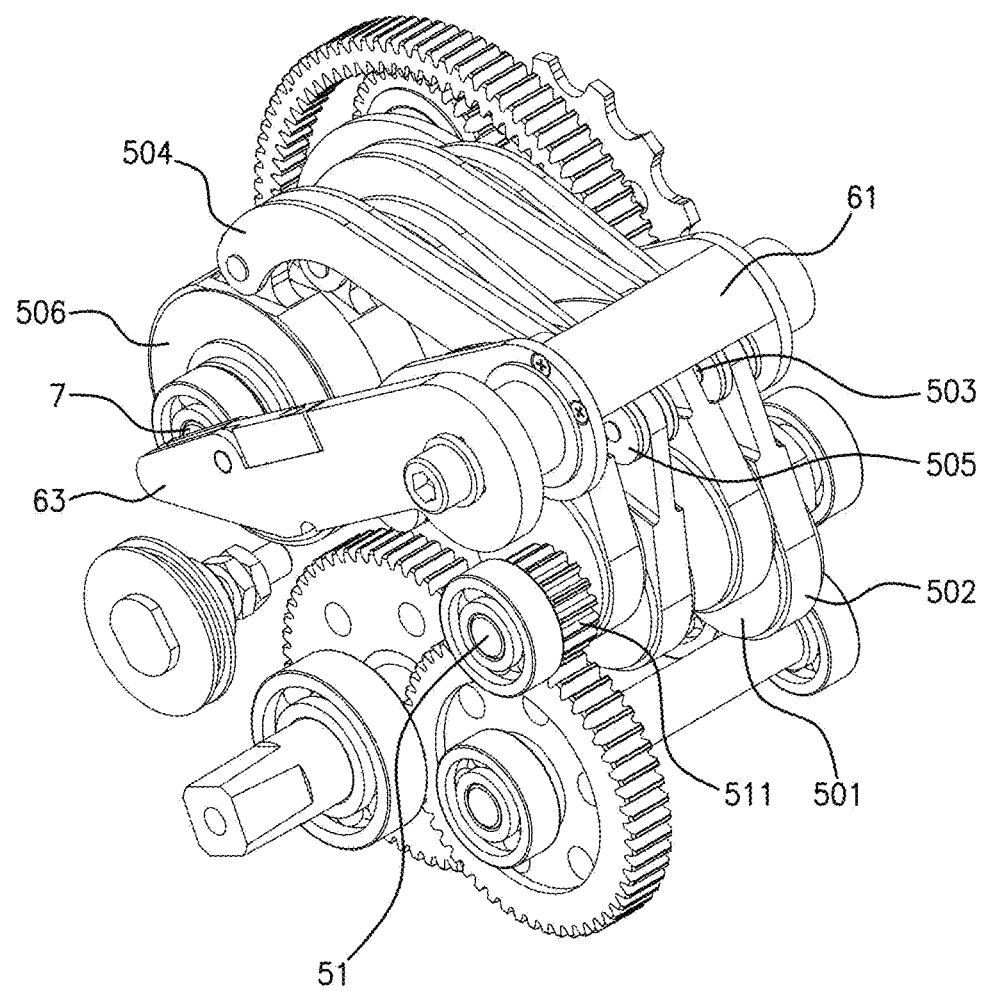
Figure 4:
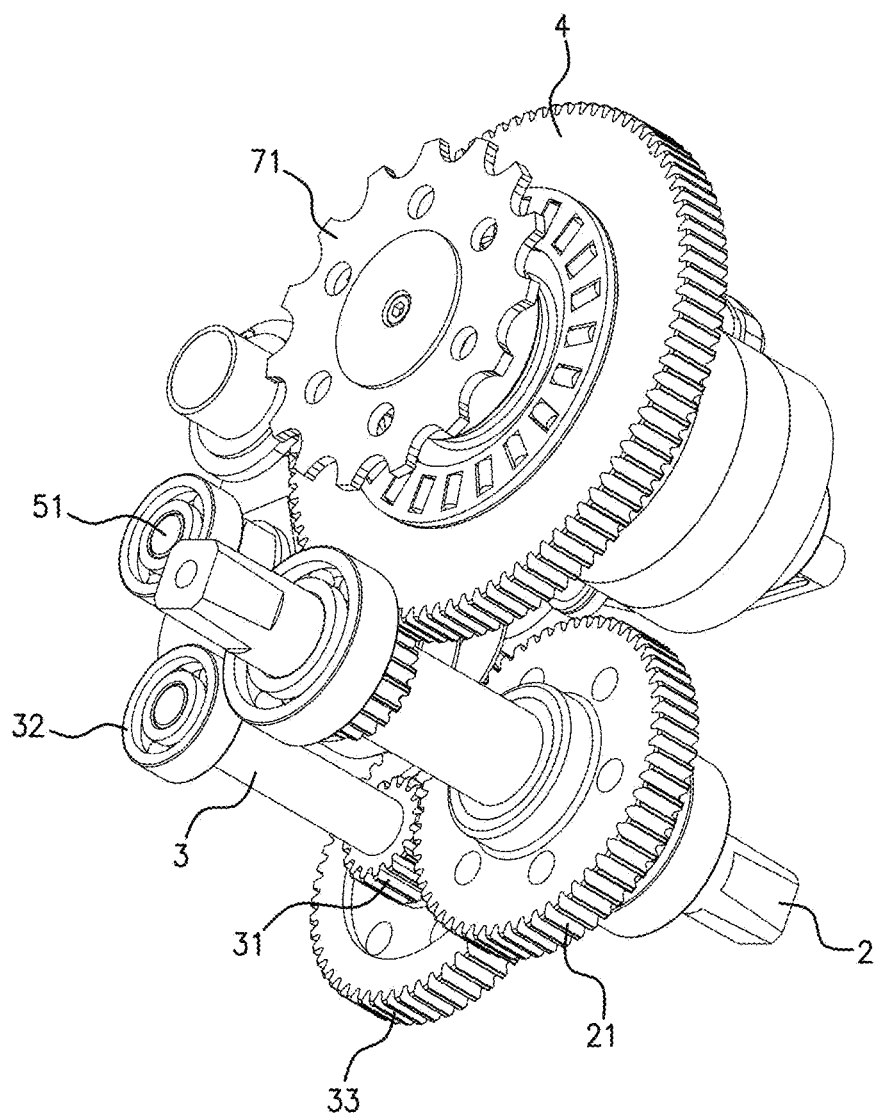

Hereinafter, various embodiments of this document are described with reference to the accompanying drawings. However, this is not intended to limit technologies described in this document to specific embodiments, and should be understood to include various modifications, equivalents, and/or alternatives of the embodiments of this document. Regarding the description of the drawings, similar reference numbers may be used for similar components.

In this document, terms such as "include", "may include", "comprise", or "may comprise" refer to existence of a corresponding feature (for example, a numerical value, a function, an operation, or a component such as a part), and does not exclude existence of an additional feature.

In this document, terms such as "A or B", "at least one of A and/or B", or "one or more of A and/or B" may include all possible combinations of items listed together with the terms. For example, "A or B", "at least one of A and B", or "at least one of A or B" may refer to all of a case of (1) including at least one A, (2) including at least one B, or (3) including both at least one A and at least one B.

Terms such as "first" or "second" used in this document may modify various components regardless of the order and/or importance, and are only used to distinguish one component from another component and does not limit the components. For example, a first user device and a second user device may represent different user devices regardless of the order or importance. For example, a first component may be named a second component without departing from the scope of rights described in this document, and similarly, the second component may also be named the first component.

A case where a certain component (for example, a first component) is described to be "operatively or communicatively coupled with/to" another component (for example, a second component) is to be understood as a case where the certain component can be directly connected to the another component or can be connected thereto with still another component (for example, a third component) therebetween. On the other hand, a case where a certain component (for example, a first component) is described to be "directly connected" to another component (for example, a second component) can be understood as a case where no other component (for example, a third component) is present between the certain component and the another component.

Terms used in this document are merely used to describe a specific embodiment and may not be intended to limit the scope of other embodiments. A singular noun may include a meaning of its plural noun, unless the context clearly indicates otherwise. Terms used herein, including technical or scientific terms, may have the same meaning as commonly understood by a person of ordinary skill in the technical field described in this document. Among terms used in this document, terms defined in general dictionaries may be construed to have the same or similar meanings, respectively, as or to the meanings the terms have in the context of related technology, and the terms are not to be construed to have ideal or overly formal meanings, respectively, unless clearly defined in this document. In some cases, even terms defined in this document may not be construed to exclude embodiments of this document.

It is needless to say that various modifications can be performed by those skilled in the art without departing from the gist of the present invention as claimed in claims of the present invention, and these modifications are not to be construed separately from the technical idea or the technical outlook of the present invention.

The terms "a vertical reciprocating motion, an upper end, a lower end," or the like used in the description of the invention are defined based on the drawings, and a shape and a position of each configuration are not limited by these terms.

According to an embodiment of the present invention, there is provided a continuously variable transmission including: an input shaft 2 that receives power as an input from outside; a planet gear 4 to which a part of the power is transmitted from the input shaft 2; a driven shaft 3 to which a part of the power is transmitted from the input shaft 2; a first link shaft 51 which is rotated with power transmitted from the driven shaft 3; a link actuator that is actuated by rotation of the first link shaft 51; a shift lever 6 that adjusts a shift ratio of the link actuator; and an output shaft 7 to which power is transmitted from the link actuator and the planet gear 4. The link actuator includes an eccentric disk 501 that eccentrically rotates around the first link shaft 51, a cam 502 that reciprocates by rotation of the eccentric disk 501, a first link 504 that is connected to the cam 502 and transmits power to the output shaft 7, and a one-way clutch 506 that is provided between the first link 504 and the output shaft 7 and transmits power only in one direction in which the output shaft is rotated. The first link shaft 51 and the output shaft 7 are driven in the same rotation direction by causing the first link shaft 51 to be rotated by the driven shaft 3.

According to a structure as described above, as illustrated in FIG. 5, the first link shaft 51 and the output shaft 7 have the same rotation direction.

Hence, an action point (particularly, the eccentric disk 501) in a process of transmitting power to the output shaft 7 by the first link shaft 51, the eccentric disk 501, the second link shaft adjusting shaft 62, the second link shaft 52, and the first link 504 is different from that in Korean Patent Registration No. 10-1241819, and thus noise, vibration, and impact are significantly reduced compared to the related art.

A central shaft (rotary shaft) of the input shaft 2, the shift lever 6, the link actuator, or the like can be fixed to a frame 1 by a member such as a bearing.

A part of the power (attractive force, engine/motor power, or the like) transmitted by the input shaft 2 can be transmitted to the output shaft 7 by the planet gear 4, and energy can be transmitted to a portion where the power is needed by a member such as a gear or a sprocket 71 formed at an end of the output shaft 7.

The rest of the power excluding losses due to friction and the like is transmitted to the link actuator through the driven shaft 3 and used in shifting within a predetermined range.

The shift lever 6 can adjust the shift ratio by adjusting an operation radius of the link actuator. At this time, the shift lever 6 has a shape which is not fastened to a specific stage, but rotates around the second link shaft adjusting shaft 62 which will be described below, and thus it is possible to perform continuously variable transmission without 'stages'.

In addition, the link actuator may include: a plurality of link sets including the eccentric disk 501, the cam 502, the first link 504, and the one-way clutch 506, and the link sets may include a hinge 503 that is connected to one side of the cam 502, and second links 505 of which each one end is connected to the hinge 503 to extend from the hinge. The first link 504 may have one end which is connected to the hinge 503 and the other end which is connected to the one-way clutch 506. The continuously variable transmission may include a second link shaft 52 connected to the other end of each of a plurality of the second links 505, and a position of the second link shaft 52 may be adjusted by the shift lever 6.

The shifting impact may be minimized if the appropriate number of link sets is provided. The drawings illustrate the embodiment equipped with four link sets. In the case of an example of having three link sets in the related art, shifting impact is partially generated, and even in the case of having five or more link sets, there were problems of deterioration in maintainability/durability arise in that the continuously variable transmission becomes unstable and the structure thereof becomes complicated.

Figure 5:
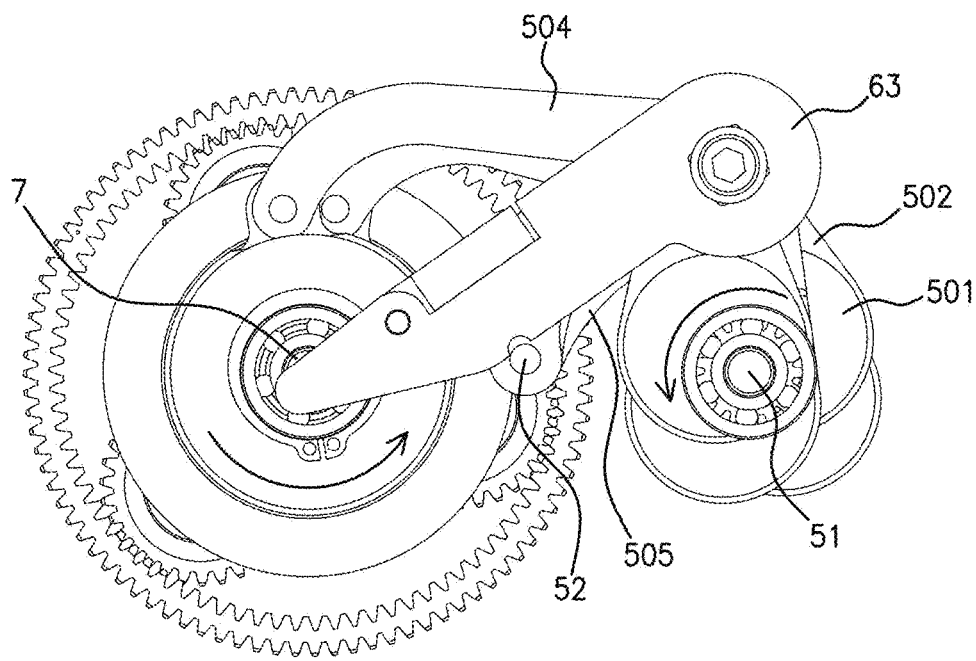
FIG. 5 is a view illustrating a process of shifting the continuously variable transmission according to the embodiment of the present invention.
Figure 5:
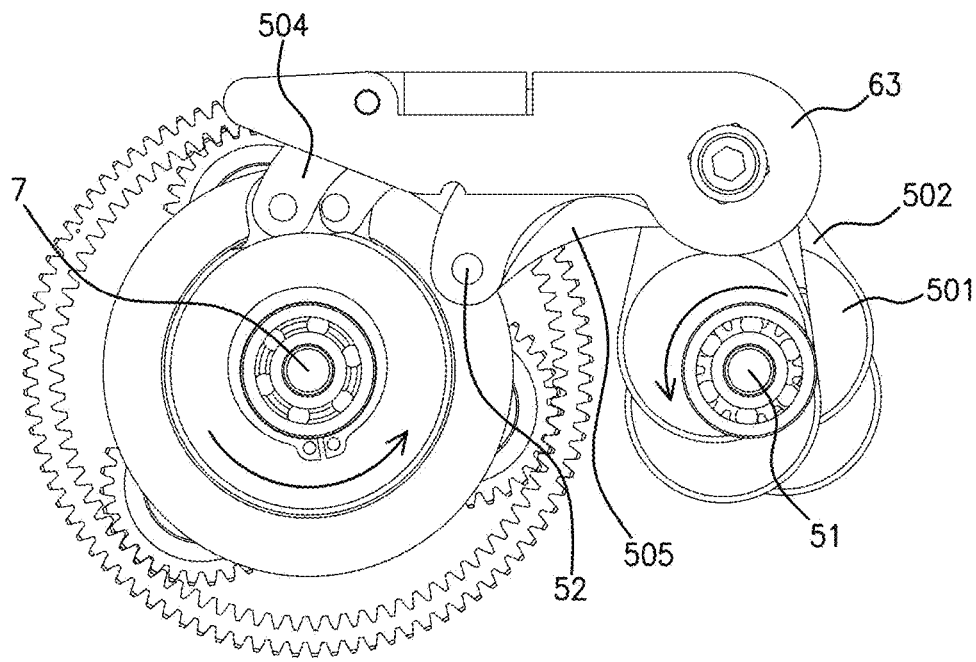
Figure 6:
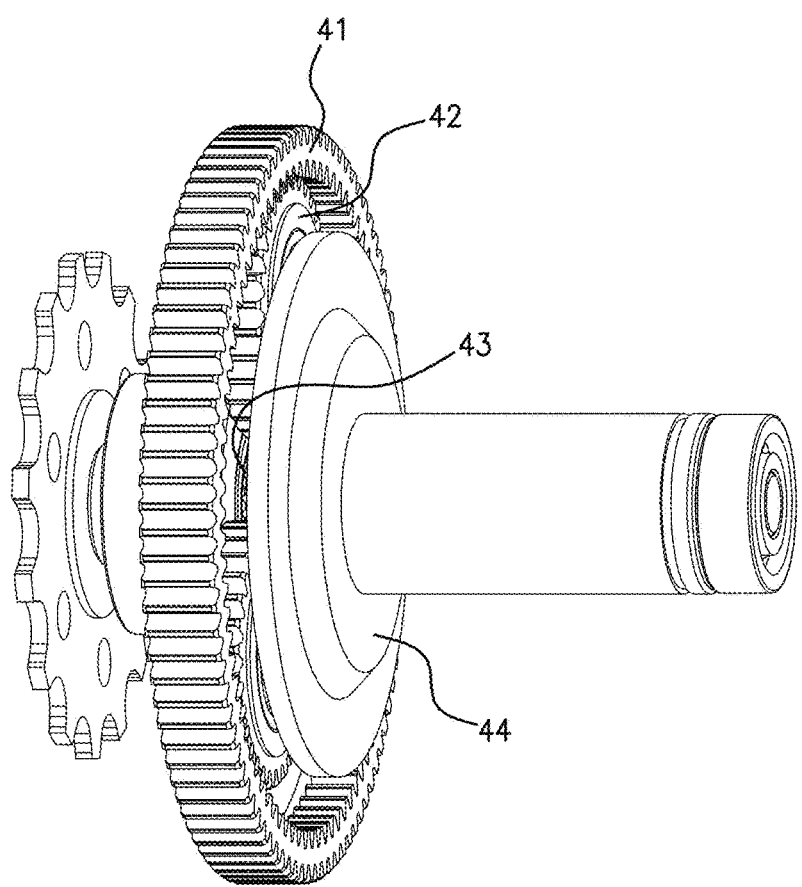
FIG. 6 is an exploded perspective view of a planet gear applied to the continuously variable transmission according to the embodiment of the present invention.

In order to minimize the shifting impact, it is preferable that the eccentric disks 501 be coupled to be eccentrically fixed to each other in different directions (at different positions) with respect to the first link shaft 51 as illustrated in FIG. 5.

The eccentric disk 501 rotates eccentrically by the rotation of the first link shaft 51, and the cam 502 (hinge 503) connected in a form of a hinge/bearing to an outer side of the eccentrically rotating eccentric disk 501 reciprocates up and down with respect to the first link shaft 51.

The one-way clutch 506 limits the movement of the first link 504 so that only movement of the first link in one direction is transmitted to the planet gear 4 (carrier 44).

Further, the shift lever 6 may include: a second link shaft adjusting part 61 that is connected to both ends of the second link shaft 52; a second link shaft adjusting shaft 62 that is fixed to a position separated from the second link shaft 52 by a predetermined distance, and a manipulation part 63 that extends from one side of the second link shaft adjusting shaft 62 in a direction perpendicular to the second link shaft adjusting shaft 62 and rotates around the second link shaft adjusting shaft 62 within a predetermined angle range.

When an end of the manipulation part 63 is positioned at an upper end, the second link shaft 52 is also fixed to a relatively highest position, and thus, a height of a bottom dead center of the hinge 503 becomes higher, and a stroke length is shortened. Hence, the first link 504 has a shortened length/speed of transmission to the one-wake clutch and fulfills a function of a low gear.

On the other hand, when the end of the manipulation part 63 is positioned at a lower end, the second link shaft 52 is also fixed to a relatively lowest position, and thus, a height of the bottom dead center of the hinge 503 becomes lower, and the stroke length becomes longer. Hence, the first link 504 has an elongated length/speed of transmission to the one-wake clutch and fulfills a function of a high gear.

A 'direction perpendicular' from the "manipulation part 63 that extends from one side of the second link shaft adjusting shaft 62 in the direction perpendicular to the second link shaft adjusting shaft 62 and rotates around the second link shaft adjusting shaft 62 within the predetermined angle range" is not limited to the 'perpendicular' in the geometric sense, and includes a configuration equivalent to a shape/structure of rotating the second link shaft adjusting shaft 62 with a relatively small force due to a predetermined moment force.

The 'predetermined angle range' means an angle range obtained by connecting a point when the second link shaft 52 is positioned at the uppermost position, a center point of the second link shaft adjusting shaft 62, and a point when the second link shaft 52 is positioned at the lowermost position, and it is preferable that the angle range be formed in a range of 25 degrees to 50 degrees.

Furthermore, the planet gear 4 may include a ring gear 41 that is an external gear with respect to a first driving gear 21 formed on the input shaft 2 and has gear teeth on an outer circumferential surface and an inner circumferential surface of the ring gear, a plurality of satellite gears 42 that are internal gears with respect to the ring gear 41, a sun gear 43 that is positioned at a center of the ring gear 41 and is an external gear with respect to the satellite gear 42, and a carrier 44 that is connected to the plurality of satellite gear 42, has a central shaft concentric to the input shaft 2, and has a predetermined hollow to allow the input shaft 2 to penetrate the carrier. The one-way clutch 506 can transmit power to the carrier 44, and the one-way clutch 506 can be configured not to be directly connected to the output shaft 7.

Effects of the present invention can be exhibited by organically combining a detailed configuration of the link actuator and a detailed configuration of the planet gear 4.

Depending on a structure of the planet gear 4, forces from two sources can generate a resultant force without interfering with each other. Since a part of the power of the input shaft 2 is transmitted through an outer side of the ring gear 41 and the power transmitted from the link actuator is transmitted to the planet gear 42 through the carrier 44, the power is transmitted to the output shaft 7 without interference, and a resultant force is generated.

In addition, the input shaft 2 may include the first driving gear 21 that transmits power to the planet gear 4, and the driven shaft 3 may include a first driven gear 31 that is connected to the first driving gear 21 and has a gear ratio such that the driven shaft 3 is accelerated faster than the input shaft 2, a bearing 32 that is separated from the input shaft 2 by a predetermined distance to have a central axis parallel to the input shaft 2 and supports the driven shaft 3, and a second driving gear 33 that is formed to have a diameter larger than a diameter of the first driven gear 31. The first link shaft 51 can include a second driven gear 511 that is connected to the second driving gear 33 and has a gear ratio such that the first link shaft 51 is accelerated faster than the driven shaft 3.

As described above, stable shifting can be performed by significantly increasing the number of revolutions input to the link actuator by accelerating, in advance, the power transmitted to the link actuator and transmitting the power to the link actuator.

REFERENCE SIGNS LIST

1: Frame
2: Input shaft
21: First driving gear
3: Driven shaft
31: First driven gear
32: Bearing
33: Second driving gear
4: Planet gear
41: Ring gear
42: Satellite gear
43: Sun gear
44: Carrier
501: Eccentric disk
502: Cam
503: Hinge
504: First link
505: Second link
506: One-way clutch
51: First link shaft
511: Second driven gear
52: Second link shaft
6: Shift lever
61: Second link shaft adjusting part
62: Second link shaft adjusting shaft
63: Manipulation unit
7: Output shaft
71: Sprocket

The invention claimed is:

1. A continuously variable transmission comprising:
an input shaft that receives power as an input from outside;
a planet gear to which a part of the power is transmitted from the input shaft;
a driven shaft to which a part of the power is transmitted from the input shaft;
a first link shaft which is rotated with power transmitted from the driven shaft;
a link actuator that is actuated by rotation of the first link shaft;
a shift lever that adjusts a shift ratio of the link actuator; and
an output shaft to which power is transmitted from the link actuator and the planet gear, wherein the link actuator includes
an eccentric disk that eccentrically rotates around the first link shaft,
a cam that reciprocates by rotation of the eccentric disk,
a first link that is connected to the cam and transmits power to the output shaft, and
a one-way clutch that is provided between the first link and the output shaft and transmits power only in one direction in which the output shaft is rotated, and
the first link shaft and the output shaft are driven in the same rotation direction by causing the first link shaft to be rotated by the driven shaft, wherein the link actuator includes a plurality of link sets including the eccentric disk, the cam, the first link, and the one-way clutch,
each of the link sets includes
a hinge that is connected to one side of the cam, and
a plurality of second links of which each one end is connected to the hinge to extend from the hinge,
the first link has one end which is connected to the hinge,
the first link has the other end which is connected to the one-way clutch,
the continuously variable transmission comprises a second link shaft connected to the other end of each of the plurality of the second links, and
a position of the second link shaft is adjusted by the shift lever, and
wherein the shift lever includes
a second link shaft adjusting part that is connected to both ends of the second link shaft,
a second link shaft adjusting shaft that is fixed to a position separated from the second link shaft by a predetermined distance, and
a manipulation part that extends from one side of the second link shaft adjusting shaft in a direction perpendicular to the second link shaft adjusting shaft and rotates around the second link shaft adjusting shaft within a predetermined angle range.

2. The continuously variable transmission according to claim 1,
wherein the planet gear includes
a ring gear that is an external gear with respect to a first driving gear formed on the input shaft and has gear teeth on an outer circumferential surface and an inner circumferential surface of the ring gear,
a plurality of satellite gears that are internal gears with respect to the ring gear,
a sun gear that is positioned at a center of the ring gear and is an external gear with respect to the satellite gear, and
a carrier that is connected to the plurality of satellite gear, has a central shaft concentric to the input shaft, and has a predetermined hollow to allow the input shaft to penetrate the carrier, and
the one-way clutch transmits power to the carrier, and the one-way clutch is configured not to be directly connected to the output shaft.

3. The continuously variable transmission according to claim 1,
wherein the input shaft includes a first driving gear that transmits power to the planet gear,
the driven shaft includes
a first driven gear that is connected to the first driving gear and has a gear ratio such that the driven shaft is accelerated faster than the input shaft,
a bearing that is separated from the input shaft by a predetermined distance to have a central axis parallel to the input shaft and supports the driven shaft, and
a second driving gear that is formed to have a diameter larger than a diameter of the first driven gear, and
the first link shaft includes a second driven gear that is connected to the second driving gear and has a gear ratio such that the first link shaft is accelerated faster than the driven shaft.

* * * * *